United States Patent

Natsunari et al.

[11] Patent Number: 6,158,976
[45] Date of Patent: Dec. 12, 2000

[54] HYDRAULIC PUMP

[75] Inventors: Koichi Natsunari, Yamato Takada; Osamu Sano, Kashihara, both of Japan

[73] Assignee: Koyo Seiko Co., Ltd., Osaka, Japan

[21] Appl. No.: 09/168,451

[22] Filed: Oct. 8, 1998

[30] Foreign Application Priority Data

Jan. 22, 1998 [JP] Japan ................... 10-010770

[51] Int. Cl.$^7$ .............. F04B 35/00; F04B 49/00
[52] U.S. Cl. .......................... 417/319; 417/223
[58] Field of Search .................. 417/223, 319; 475/185

[56] References Cited

U.S. PATENT DOCUMENTS

| | | | |
|---|---|---|---|
| 3,793,910 | 2/1974 | Nasvytis | 74/796 |
| 4,196,638 | 4/1980 | Lyons, Jr. | 74/200 |
| 4,625,587 | 12/1986 | Hosono | 74/752 |
| 4,730,515 | 3/1988 | Taneyuki | 74/752 A |
| 5,147,254 | 9/1992 | Baier et al. | 475/121 |
| 5,484,346 | 1/1996 | Tokumoto et al. | 475/185 |

FOREIGN PATENT DOCUMENTS

| | | |
|---|---|---|
| 57-15064 | 1/1982 | Japan . |
| 5-4587 | 1/1993 | Japan . |
| 5-4588 | 1/1993 | Japan . |
| 5-8751 | 1/1993 | Japan . |
| 7-133854 | 5/1995 | Japan . |
| 2091357 | 7/1982 | United Kingdom . |

*Primary Examiner*—Noah P. Kamen
*Assistant Examiner*—Mahmoud M Gimie
*Attorney, Agent, or Firm*—Darby & Darby

[57] ABSTRACT

The hydraulic pump has a rotor which rotates together with an input shaft linked with an automobile's engine, and generates a hydraulic pressure to be applied to a hydraulic actuating apparatus on the automobile. The hydraulic pump also has a transmission unit provided between a rotating shaft of the rotor and the input shaft so as to change a transmission ratio therebetween, and a hydraulic clutch which changes the transmission unit by means of the hydraulic pressure generated at a discharge side of a pump main body so as to apply the pressure to the apparatus. Therefore, the transmission according to an operating state of the apparatus and a rotational speed of the engine can be realized with a simple constitution and no requirement for a sensor for detecting a running state and a controller for controlling according to the detection.

12 Claims, 7 Drawing Sheets

HYDRAULIC PUMP

BACKGROUND OF THE INVENTION

The present invention relates to a hydraulic pump which is driven by an engine so as to generate a hydraulic pressure to be applied to a hydraulic actuating apparatus mounted to an automobile.

Recent automobiles have various hydraulic actuating apparatuses such as a power steering apparatus and automatic transmission apparatus, and a hydraulic pump for generating a hydraulic pressure to be applied to these apparatuses is mounted thereto.

Most of these hydraulic pumps utilize a part of a generated power of a car-mounted engine. These pumps are driven by a belt transmission via a power-taking-out pulley provided to an end of a crank shaft of the engine. However, in the case of such a simple transmission constitution, power loss due to the driving of the hydraulic pump is large at high-speed operation while the engine is rotating at a high speed, and thus there is a disadvantage that fuel consumption is increased. On the contrary, in the case where the specification of the hydraulic pump is determined in order to reduce this power loss, the performance of the hydraulic pump is insufficient at low-speed operation while the engine is rotating at a low speed or at stopping, and thus there arises a problem that sufficient hydraulic pressure cannot be obtained.

As mentioned above, in the hydraulic pumps which generates a hydraulic pressure to be applied to the hydraulic actuating apparatus mounted to the automobile, it is required to maintain a sufficient hydraulic pressure when necessary, and to reduce inadequate power loss of the engine as a driving source. In order to satisfy this requirement, the following two constitutions have been disclosed.

The first constitution directs its attention to, for example, that in a hydraulic-type power steering apparatus which assists a power necessary for steering by using a hydraulic pressure, most of the hydraulic actuating apparatuses mounted to automobiles do not always require the application of a hydraulic pressure, namely, the application is required only while steering. This constitution has been disclosed in Japanese Patent Application Laid-Open No. 57-15064 (1982) as a power steering apparatus, and in the apparatus, a pair of hydraulic pumps for applying a hydraulic pressure is provided, and a clutch is provided to a halfway of a transmission system of one of the hydraulic pumps and the clutch is controlled to connect/disconnect according to results of detecting a running states such as a rotational speed of the engine and steering state so that one hydraulic pump is driven normally or two hydraulic pumps are driven if necessary.

In this constitution, the reason for always driving one hydraulic pump is that a hydraulic oil is prevented from being viscous much when the air temperature is low by always providing a flow of a hydraulic oil. By capacity of the hydraulic pump always driven is made to be small, the power loss can be reduced as much as possible.

The second constitution is disclosed in Japanese Patent Application Laid-Open 7-133854 (1995), and in this constitution, a ring cone-type infinite variable-speed drive is provided between an input shaft connected with an engine and a rotor shaft of a hydraulic pump. A variable speed ring of the infinite variable-speed drive is press-moved by a pressing body which moves in the radial direction by means of a centrifugal force according to rotation of the input shaft so that a transmission ratio is changed. When the engine is rotated at a low speed, the rotation is transmitted directly to the hydraulic pump, and when the engine is rotated at a high speed, the rotation is transmitted to the hydraulic pump after the rotational speed is reduced to a predetermined value. As a result, a reduce in power loss while high-speed operation and elimination of insufficient flow of the hydraulic oil low-speed operation are achieved simultaneously.

As the infinite variable-speed drive provided between the input shaft and rotor shaft, instead of the aforementioned ring cone-type infinite variable-speed drive, another type of the infinite variable-speed drives such as the variable-speed pitch pulley-type can be used. Moreover, a change in the transmission ratio can be achieved by using an adequate actuator which is actuated according to results of detecting running states of the automobile such as a rotational speed of the engine and a steering state. The hydraulic pump having such a constitution is also suggested.

However, the first constitution requires two hydraulic pumps, transmission systems for achieving transmission between the hydraulic pumps and engine, and the clutch provided in one of the transmission systems. Further, this constitution requires a sensor for detecting the running state, and a controlling apparatus for connecting/disconnecting the clutch based on the detected results of the sensor. For this reason, the whole constitution becomes complicated, and faulty action due to external noises might occur.

Meanwhile, in the second constitution, since the transmission ratio between the input shaft and rotor shaft is changed by mechanical means actuated by means of a centrifugal force, there is an advantage that faulty actuation due to external noises might not occur. On the contrary, this constitution has a problem that the infinite variable-speed drive including the means is hardly down-sized. In the case where another infinite variable-speed drive is used instead of the ring cone-type infinite variable-speed drive in order to achieve the down-sizing, much stronger force is required to change the transmission ratio, and thus there is a problem that mechanical transmission means which is driven by the centrifugal force is hardly achieved.

In addition, in this constitution, the transmission ratio is changed only according to the rotational speed of the engine, so the actuating state of the hydraulic actuating apparatus to which hydraulic pressure is applied is not reflected. Therefore, there arose a problem that the constitution results in inadequate power loss to the engine in a running state which does not require the application of a hydraulic pressure.

This problem, as mentioned above, is eliminated by using an adequate actuator actuated according to results of detecting running states of the automobile in order to achieve the transmission. The transmission using such kind of the actuator can be achieved by using an infinite variable-speed drive other than the ring cone-type. However, in this case, similarly to the first constitution, the sensor for detecting running state and the controlling apparatus for controlling the actuator based on the detected results of the sensor are required, and thus this causes complication of the whole constitution and faulty actuation due to external noises.

BRIEF SUMMARY OF THE INVENTION

The present invention has been made with the aim of solving the above problems, and it is one object of the present invention to provide a hydraulic pump which can simultaneously realize transmission according to an actuating state of a hydraulic actuating apparatus and transmission according to a rotational speed of an engine as a driving source by mechanical means without requiring a sensor for detecting a running state and controlling means for making control according to the detected results, and can maintain sufficient hydraulic pressure only when necessary and simultaneously can reduce inadequate power loss of the engine as much as possible.

A hydraulic pump according to the present invention is characterized in that an input shaft is rotated by a power sources such as an engine in an automobile, and transmission means, which changes a transmission ratio of the input shaft and a rotor which is rotated by means of linkage with the rotation of the input shaft, is provided between the rotor and input shaft, and a hydraulic clutch makes the transmission means change by means of the hydraulic pressure applied to a hydraulic actuating apparatus mounted into the automobile.

In this invention, the generated hydraulic pressure of the hydraulic pump is changed according to the actuating state of the hydraulic actuating apparatus to which the hydraulic pressure is applied so as to rise during the actuation and fall during non-actuation. While the hydraulic actuating apparatus which requires application of the hydraulic pressure is being actuated, the hydraulic clutch is actuated by means of the applied hydraulic pressure which rises according to the actuation, and the transmission means, which is provided between the input shaft and rotating shaft of the rotor, is changed into the high speed side. As a result, the rotational speed of the rotor is increased so that sufficient hydraulic pressure is secured. Moreover, while the hydraulic actuating apparatus which does not require application of the hydraulic pressure is not being actuated, the hydraulic clutch is actuated by means of the hydraulic pressure which is reduced during the non-actuation. As a result, the transmission means is changed into low speed side so that the rotational speed of the rotor is lowered, and power loss of the power source can be reduced.

Another hydraulic pump of the present invention is characterized by further including a centrifugal spool which moves by means of a centrifugal force due to the rotation of the input shaft and then releases a pressure acting upon the hydraulic clutch so as to prohibit the transmission means to be changed into the high speed side.

In this invention, in the case where the rotation of the input shaft, which is linked with an output terminal of the power source becomes excessive, the centrifugal spool moves by means of the centrifugal force due to the rotation of the input shaft, and the transmission means is prohibited to be changed into the high speed side. As a result, excessive increase in the rotational speed of the rotor is prevented so that the power loss of the power source is reduced. At this time, the rotational speed of the input shaft is reduced by the transmission means so that the rotation is transmitted to the rotor, but since the rotational speed of the input shaft is high, the rotational speed of the rotor is maintained so as to be higher to some degree, so the hydraulic pressure to be applied to the hydraulic actuating apparatus can be secured sufficiently.

Another hydraulic pump of the present invention is characterized in that an oil releasing path for releasing the hydraulic pressure includes a variable restrictor for changing a restriction area according to a form or size of a chamfered portion formed on one portion of the centrifugal spool, and a fixed restrictor for adding a predetermined restriction resistance to the hydraulic pressure passed through the variable restrictor.

In this invention, in the case where the centrifugal spool moves according to an increase in the rotational speed of the input shaft, the pressure acting on the hydraulic clutch passes through the variable restrictor whose restriction area is changed according to a form and size of the chamfered portion formed on the centrifugal spool and through the fixed restrictor so as to be released. As a result, an abrupt change in the pressure is relieved and thus the hydraulic clutch is not changed abruptly, and discontinuity of the pressure characteristic in the discharge side of the hydraulic pump is eliminated so that smooth pressure characteristic can be obtained. This modification can be adjusted easily by additional processes of the chamfered portion and fixed restrictor so that desired pressure characteristic can be acquired.

Another hydraulic pump of the present invention is characterized in that the transmission means includes planetary bodies held onto holding means which rotates integrally with the rotating shaft of the rotor, a sun disc which is provided coaxially between the rotating shaft and input shaft and rotatively contacts with the planetary bodies, and a one-way clutch provided between the sun disc and input shaft. Moreover, the hydraulic clutch includes a clutch plate which rotates integrally with the holding means, and a piston whose rotation is restrained by the input shaft and which moves in the axial direction by means of the applied hydraulic pressure so as to be pressed against the clutch plate.

In this invention, the transmission means between the input shaft and rotor has the planetary bodies and sun disc, and it is arranged compactly between the input shaft and rotor as a planetary roller transmission or a planetary gear transmission, which reduces the speed of the input shaft so as to transmit the rotation of the input shaft to the rotating shaft of the rotor via the sun disc, planetary bodies, and holding means. This changing of the transmission means into the high speed side is realized by restraining the rotating shaft of the rotor via the holding means rotating integrally with the clutch plate and rotating the rotating shaft at a speed same as that of the input shaft by means of the hydraulic clutch which is constituted compactly in one side of the transmission means so as to have the clutch plate rotating integrally with the holding means and piston whose rotation is restrained by the input shaft and which moves in the axial direction by means of the applied hydraulic pressure so as to be pressed against the clutch plate. Here, the rotation of the sun disc rotatively contacting with the planetary bodies due to the restriction of the holding means which precedes the rotation of the input shaft is allowed by the one-way clutch provided between the sun disc and input shaft.

The above and further objects and features of the invention will more fully be apparent from the following detailed description with accompanying drawings.

DETAILED DESCRIPTION OF THE INVENTION

The present invention will now be described in detail referring to the accompanying drawings illustrating embodiments thereof.

Embodiment 1

Figure 1:
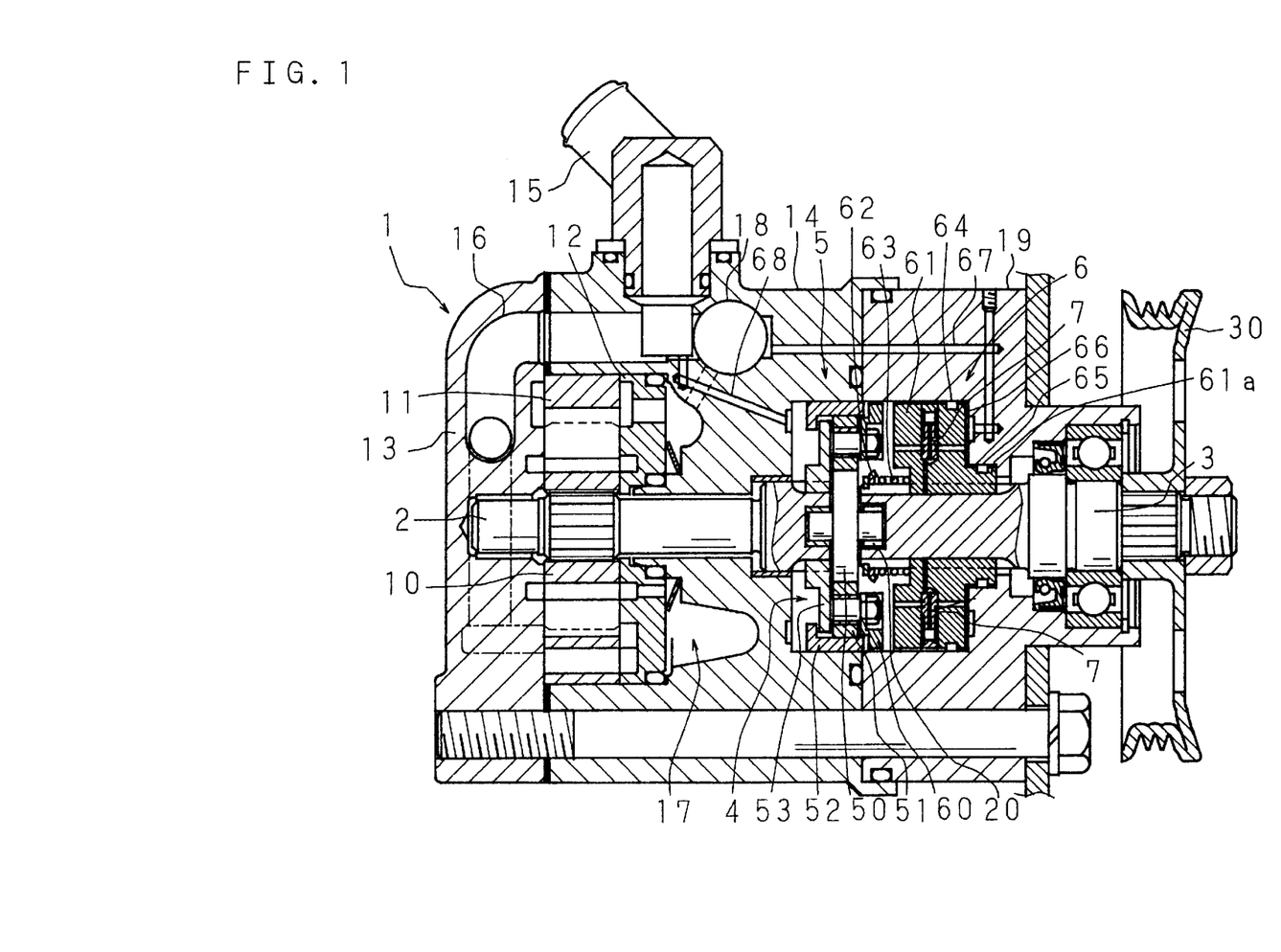
FIG. 1 is a longitudinal sectional view showing a first embodiment of a hydraulic pump according to the present invention.

FIG. 1 is a longitudinal sectional view showing a hydraulic pump of the first embodiment according to the present invention. The hydraulic pump shown in the drawing has a pump main body 1 arranged as a vane pump having a short drum-shaped rotor 10 where plural vanes being movable forward and backward in the radial direction are attached, and having a cam ring 11 with a non-uniform thickness and annular shape. The cam ring 11 as well as a pressure plate 12 which is located coaxially in one side of the cam ring 11 is housed in a pump housing 14, and the cam ring 11 is sandwiched and fixed between an end plate 13 for closing the other side of the pump housing 14 and the pressure plate 12.

The rotor 10 pierces through axial center portions of the pressure plate 12 and cam ring 11, and its tip is spline-connected with a halfway portion of the rotor shaft 2 supported onto the end plate 13 so that the rotor 10 can be rotated in the inside of the cam ring 11 sandwiched between the pressure plate 12 and end plate 13.

The inside of the cam ring 11 is provided with plural concave portions in a peripheral direction, and pump chambers are arranged between the concave portions and an outer peripheral surface of the rotor 10. The plural vanes held onto the rotor 10 are elasticized by a hydraulic pressure generated in a pressure chamber 17 so as to direct outward in the radial direction. As a result, the vanes are pressed against an inner peripheral surface of the cam ring 11 including the insides of the respective pump chambers. Therefore, the rotor 10 is rotated according to the rotation of the rotor shaft 2 with the vanes are being pressed.

The respective pump chambers are connected with an inlet tube 15 mounted to an outside of the pump housing 14 via an oil inlet path 16 formed on a peripheral wall of the pump housing 14 and on the end plate 13, and the pump chambers are connected with a discharge tube, not shown, via the pressure chamber 17 formed on a rear side of the pressure plate 12 and via a discharge chamber 18 bored into the pump housing 14. The discharge tube is connected with an adequate hydraulic actuating apparatus such as a power steering apparatus to which a hydraulic pressure is applied, and the inlet tube 15 is connected with an oil tank storing hydraulic oil of the hydraulic actuating apparatus.

In the case where the rotor 10 is rotated according to the rotation of the rotor shaft 2, hydraulic oil is introduced into the insides of the pump chambers arranged on the outside of the rotor 10 via the inlet tube 15 and the oil inlet path 16. The introduced oil is sealed between adjacent vanes and is rotated together with the rotor 10 so that its pressure is raised. Then the oil is discharged into the discharge tube via the pressure chamber 17 and discharge chamber 18 so as to be supplied to the hydraulic actuating apparatus.

The rotor shaft 2 which is a rotating shaft of the rotor 10 pierces through the pump housing 14 on the side of the pressure chamber 17 so as to be protruded outward by an adequate length. A transmission housing 19 is mounted coaxially to an end of the pump housing 14 on the same side, and an input shaft 3 is supported into the transmission housing 19 so as to be rotatable coaxially with the rotor shaft 2. One end of the input shaft 3 is protruded from the outside of the transmission housing 19 by an adequate length, and the protruded end is connected with an output terminal of an engine, not shown, via a V-pulley 30 fixed into the protruded end and via a V-belt, not shown, wound around the V-pulley 30.

The other end of the input shaft 3 protruded into the transmission housing 19 faces one end of the rotor shaft 2 protruded from the pump housing 14, and a transmission chamber 4 having a circular section is formed coaxially therearound. A transmission unit 5 which is a characteristic of the present invention and a hydraulic clutch 6 are arranged inside the transmission chamber 4.

The transmission unit 5 shown in the drawing is arranged as a planetary roller transmission unit having a sun roller 50, planetary roller 51, and fixing ring 52. The sun roller 50 is a disc with an adequate thickness, and it is provided in the facing portion between the rotor shaft 2 and input shaft 3. Supporting shafts protruded from both sides of its thickness direction are supported to axial center portions of shafts 2 and 3 so that the sun roller 50 is supported coaxially with the shafts 2 and 3.

The sun roller 50 is supported on the side of the rotor shaft 2 by a bush fitted into an axial center portion of the rotor shaft 2 so that relative rotation is possible. Meanwhile, a one-way clutch 20 for allowing the sun roller 50 to rotate precedingly intervenes on the supporting portion of the sun roller 50 in the side of the input shaft 3. As a result, the sun roller 50 rotates according to the rotation of the input shaft 3 by hooking with the one-way clutch 20 in the normal state that the rotation of the input shaft 3 precedes, whereas, as mentioned above, in the case where the rotation of the sun roller 50 precedes the rotation of the input shaft 3, the sun roller 50 can be rotated freely by releasing of the hoking with the one-way clutch 20 between the rotor shaft 2 and input shaft 3 without their restraint.

The fixing ring 52 is fitted into the inside of the transmission chamber 4 in a position where the fixing ring 52 approximately aligns with the provided position of the sun roller 50 in the axial direction, and the planetary rollers 51 are provided between the fixing ring 52 and sun roller 50 at approximately equal intervals in the peripheral direction. These planetary rollers 51 are rotatively mounted onto respective supporting shafts protruded from one surface of a disc-shaped carriage 53 spline-connected with one end of the rotor shaft 2 coaxially so as to rotatively contact with an outer peripheral surface of the sun roller 50 and an inner peripheral surface of the fixing ring 52. The planetary rollers 51 autorotate about the respective supporting shafts by the rotation of against the sun roller 50 and the fixing ring 52, and at the same time they as well as the carriage 53 revolves about the rotor shaft 2.

In the case where the input shaft 3 is rotated by means of transmission from the engine, this rotation is transmitted to the sun roller 50 via the one-way clutch 20, and the sun roller 50 rotates about its axis. Then the planetary rollers 51 which rotatively contacts with the outer periphery of the sun roller 50 autorotate, and their carriage 53 revolves, and then the rotor shaft 2 and rotor 10 are rotated at this revolving speed. At this time, the rotation of the input shaft 3 whose speed is reduced is transmitted to the rotor shaft 2, and the rotor shaft 2 and rotor 10 are driven at a lower speed than the rotational speed of the input shaft 3.

Meanwhile, a disc-shaped clutch plate 60 is mounted integrally to tips of the supporting shafts of the planetary rollers 51 protruded from the carriage 53, and the clutch plate 60 and a clutch piston 61 which faces the clutch plate 60 compose the hydraulic clutch 6.

As for the clutch piston 61, its inner diameter side is engaged with a spline formed on a midway portion of the outer periphery of the input shaft 3 so that its rotation is restrained by the input shaft 3, and at the same time it is mounted so as to be movable in the axial direction. A coil spring 63 is provided between the clutch piston 61 and a spring accession 62 provided on the tip of the input shaft 3 in a side counter to the clutch plate 60 so that the clutch piston 61 is elasticized by a spring force of the coil spring 63 to a direction where the clutch piston 61 is separated from the clutch plate 60.

The clutch piston 61 mounted in such a manner has a small diameter portion 61a which is coaxially protruded from the non-countered side to the clutch plate 60. An outer diameter side of the clutch piston 61 is fitted into an inner cavity portion of the transmission housing 19 composing the transmission chamber 4, and the small diameter portion 61a is fitted into a fitting hole connected with the same side of the transmission chamber 4, respectively via sealing rings 64 and 65. A cylinder chamber 66 whose both sides are sealed tightly with the sealing rings 64 and 65 is formed on the non-countered side to the clutch plate 60.

The cylinder chamber 66 is connected with the discharge chamber 18 of the pump main body 1 by means of an oil guiding path 67 bored into the transmission housing 19 and pump housing 14, and the other side of the clutch plate 60 is connected with the oil inlet path 16 of the pump main body 1 by means of an oil returning path 68 bored into the pump housing 14. As a result, a hydraulic pressure, which is generated in the discharge chamber 18 by the rotation of the rotor 10 in the pump main body 1, is applied to the hydraulic actuating apparatus, and is introduced into the cylinder chamber 66 via the oil guiding path 67. Meanwhile, at this time, since the other side of the clutch piston 61 is maintained in a low-pressure state by the connection with the oil inlet path 16, the clutch piston 61 is pressed towards the clutch plate 60 by the hydraulic pressure applied to the hydraulic actuating apparatus, and when this pressing force exceeds the spring force of the coil spring 63, the clutch piston 61 moves towards the clutch plate 60 and is pressed against the clutch plate 60.

Figure 2:
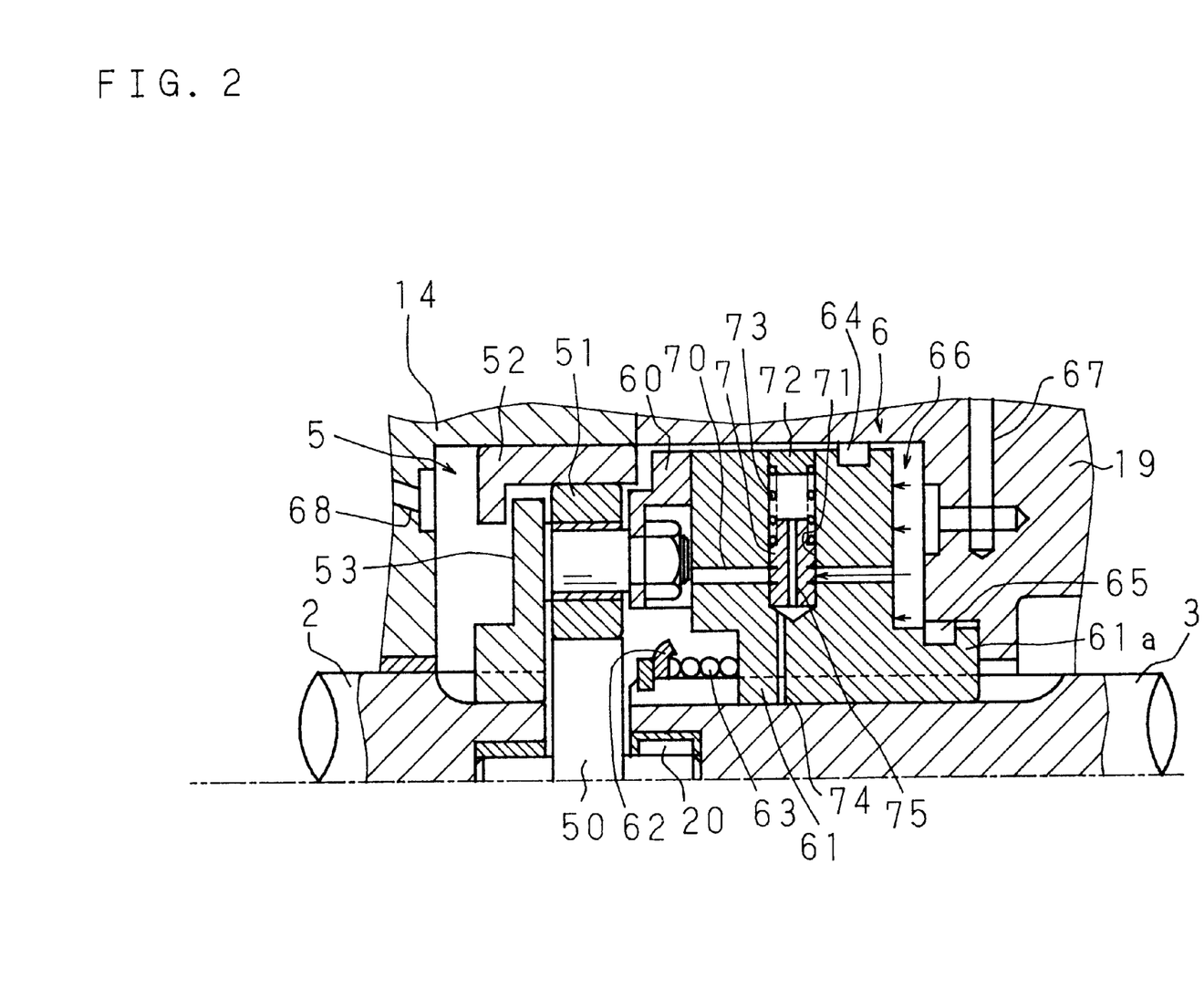
FIG. 2 is an explanatory drawing showing an operation of a hydraulic clutch shown in FIG. 1.

FIG. 2 is an explanatory drawing showing an operation of the hydraulic clutch 6, and it shows that the clutch piston 61 is pressed against the clutch plate 60 by the applied hydraulic pressure. In this state, the clutch plate 60 rotates at a speed same as the clutch piston 61 whose rotation is restrained by the input shaft 3. As a result, since the clutch plate 60 is mounted integrally to the tips of the supporting shafts of the planetary rollers 51, the carriage 53 of the planetary rollers 51 and the rotor shaft 2 for supporting the carriage 53 rotate at a speed same as the input shaft 3. Meanwhile, at this time, the sun roller 50 rotates at high speed according to the rotation of the planetary rollers 51 on its outer peripheral surface, but this rotation of the sun roller 50 is allowed by the one-way clutch 20 provided between the sun roller 50 and input shaft 3, so this rotation does not obstruct the rotation of the input shaft 3 and rotor shaft 2.

As mentioned above, the hydraulic clutch 6 changes the transmission ratio of the transmission unit 5 arranged as a planetary roller transmitter between high or low speed by means of the hydraulic pressure introduced into the cylinder chamber 66. This changing is carried out on the discharge side by the actuation of the pump main body 1, and the changing operation is performed according to the level of the hydraulic pressure introduced into the cylinder chamber 66.

The hydraulic pressure, which is generated in the discharge side of the pump main body 1, is changed according to the actuation of the hydraulic actuating apparatus to which the hydraulic pressure is applied, for example, in a hydraulic power steering apparatus for assisting a force required for steering of an automobile by means of a hydraulic pressure, the hydraulic pressure applied to this apparatus rises according to the steering. In the case of using the hydraulic pump according to the present invention, the clutch piston 61 is moved by the applied hydraulic pressure which rose so as to be pressed against the clutch plate 60, and the transmission unit 5 is changed to the high speed side. As a result, the rotational speed of the rotor shaft 2 and rotor 10 increases, and the generated hydraulic pressure in the discharge side of the pump main body 1 further rises so that the hydraulic actuating apparatus can be actuated securely by the application of the hydraulic pressure.

Meanwhile, in the case where the hydraulic pressure applied to the power steering apparatus is lowered according to the termination of steering, the clutch piston 61 is pressed in the opposite direction by the spring force of the coil spring 63, and as shown in FIG. 1, it is moved away from the clutch plate 60. At this time, the rotation of the input shaft 3 whose speed was reduced by the transmission unit 5, as mentioned above, transmitted to the rotor shaft 2 and rotor 10 so that the rotor 10 rotates at a low speed. As a result, the power loss of the engine as a driving source can be reduced greatly.

Further, as shown in FIG. 2, a perforation 70, whose one end is opened into the cylinder chamber 66 and which perforates in the axial direction, is formed on the clutch piston 61, and a spool chamber 71 connected with a halfway portion of the perforation 70 is formed as a circular hole bored from the outer peripheral surface to the radial direction. A centrifugal spool 7 is housed in the spool chamber 71.

Figure 3A:
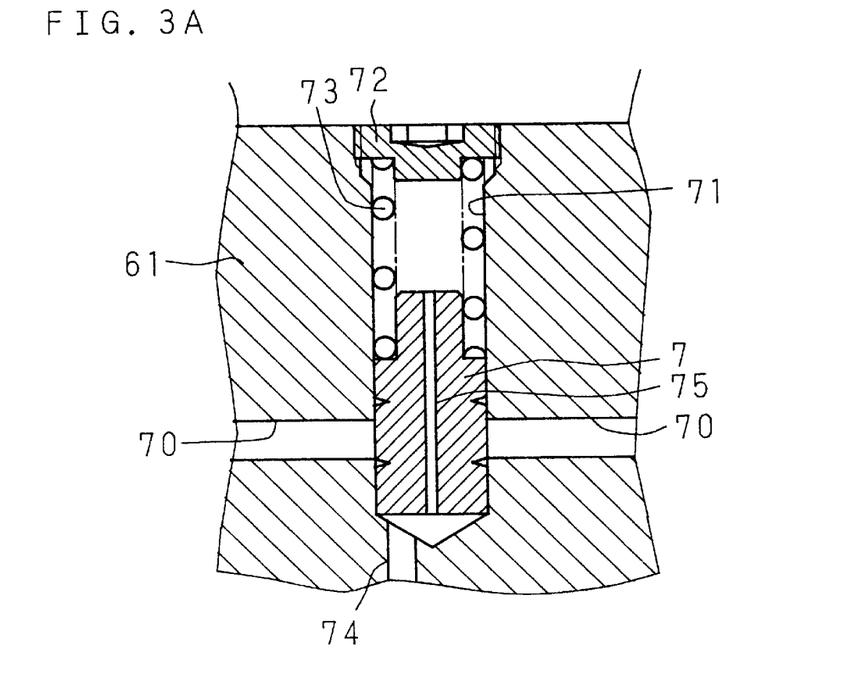
FIGS. 3A and 3B are enlarged sectional views showing a vicinity of a spool chamber for explaining an operation of a centrifugal spool shown in FIG. 2.
Figure 3B:
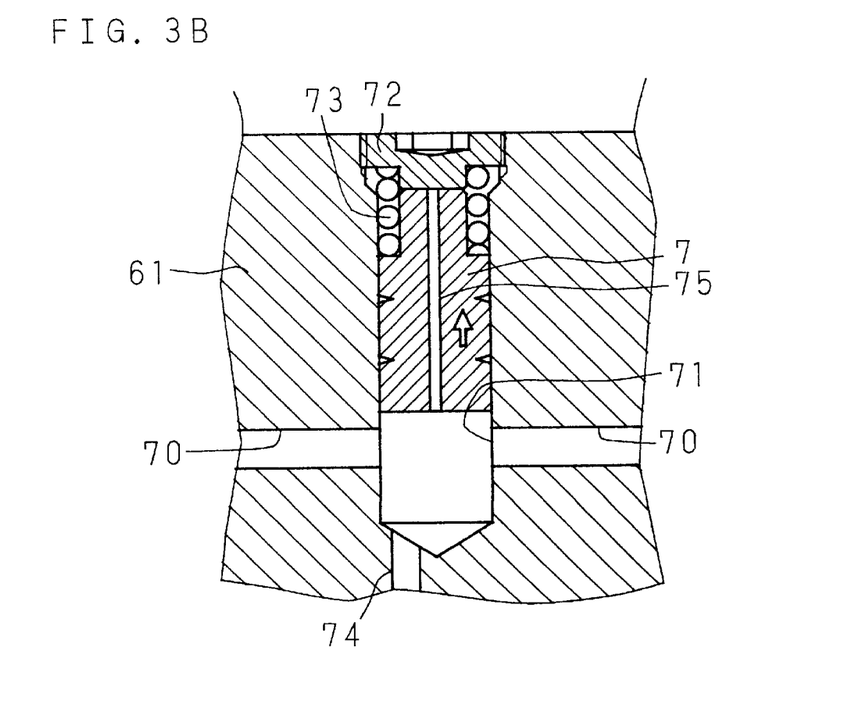

FIGS. 3A and 3B are enlarged sectional views of a vicinity of the spool chamber 71 for explaining an operation of the centrifugal spool 7. As shown in the drawing, the centrifugal spool 7 is housed in the spool chamber 71 so as to slide to its depth-wise direction, namely, movably to the radial direction of the clutch piston 61. The end of the spool chamber 71 opened into the outer diameter side of the clutch piston 61 is sealed tightly by a cover member 72 fitted into the opened end, and the centrifugal spool 7 is elasticized by the spring force of the coil spring 73 provided between the centrifugal spool 7 and cover member 72 so as to direct to the inward side of the spool chamber 71, namely, to the inwardly radial direction of the clutch piston 61.

The spool chamber 71 for housing the centrifugal spool 7 is connected with the inner peripheral side of the clutch piston 61 by a connection hole 74 which is formed from the bottom portion of the spool chamber 71 towards the inwardly radial direction, and a pressure therein is maintained in the approximately same as that in the chamber where the transmission unit 5 is provided. A connection hole 75 is formed on the centrifugal spool 7 so as to perforate through a central portion of the centrifugal spool 7, and this connection hole 75 connects spaces on both sides of the centrifugal spool 7 inside the spool chamber 71. As a result, the centrifugal spool 7 slides in the spool chamber 71 without being influenced by a difference in pressure between the both sides.

As represented by a white arrow in FIG. 3B, a centrifugal force is applied to the centrifugal spool 7 held onto the clutch piston 61 as mentioned above according to the rotation of the clutch piston 61 due to the rotation of the input shaft 3. This force directs to the outwardly radial direction of the clutch piston 61, namely, to the direction opposite to that of the spring force of the coil spring 73. Therefore, the centrifugal spool 7 slides according to the balance between the centrifugal force and spring force.

In the case where the rotational speed of the input shaft 3 is low and the centrifugal force applied to the centrifugal spool 7 is less than the spring force of the coil spring 73, the centrifugal spool 7 is restrained in a position where it contacts with the bottom portion of the spool chamber 71, and as shown in FIG. 3A. the perforation 70 which intersects the halfway portion of the spool chamber 71 is blocked.

Meanwhile, in the case where the rotational speed of the input shaft 3 is high and the centrifugal force applied to the centrifugal spool 7 exceeds the spring force of the coil spring 73, the centrifugal spool 7 slides to the outwardly radial direction, and when the sliding amount exceeds a predetermined amount, as shown in FIG. 3B, the perforation 70 which intersects the halfway portion of the spool chamber 71 is opened so that the cylinder chamber 66 formed in one side of the clutch piston 61 is connected with the other side, namely, to the space where the transmission unit 5 is provided in the transmission chamber 4.

Figure 4:
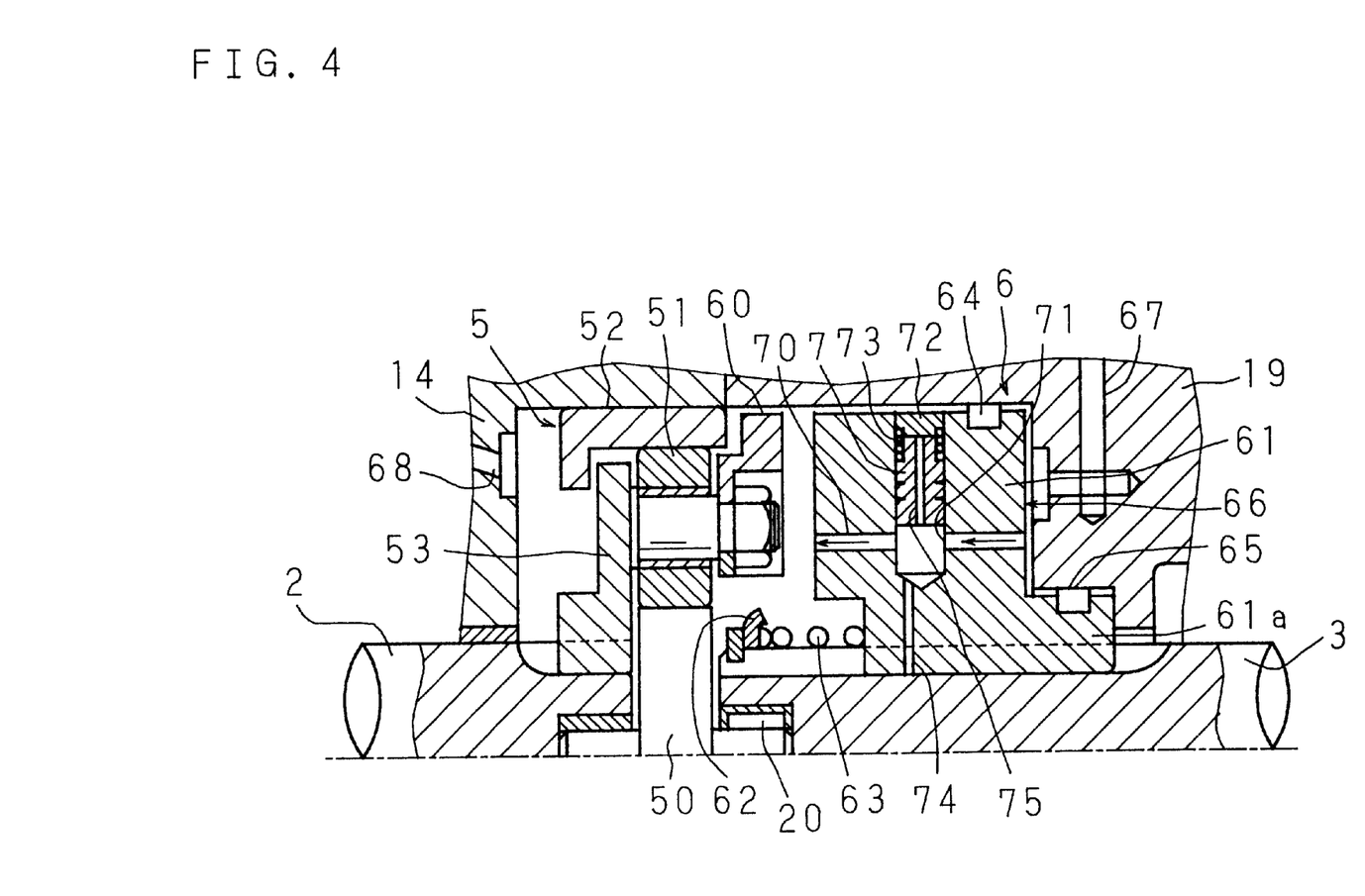
FIG. 4 is an explanatory drawing showing an operation of the hydraulic clutch when the centrifugal spool shown in FIG. 2 is moved.

FIG. 2 shows an operating state of the hydraulic clutch 6 in the case where the rotational speed of the input shaft 3 is low and the centrifugal spool 7 is in the position shown in FIG. 3A. On the contrary, FIG. 4 is an explanatory drawing showing an operation of the hydraulic clutch 6 in the state that the rotational speed of the input shaft 3 is high and the centrifugal spool 7 is moved to the position shown in FIG. 3B by the centrifugal force due to the rotation of the input shaft 3.

In the case where the centrifugal spool 7 is in the position shown in FIG. 3B, the perforation 70 is opened, but accordingly the space, where the transmission unit 5 is provided and which is connected with the cylinder chamber 66, as mentioned above, is connected with the oil inlet path 16 of the pump main body 1 via the oil returning path 68 so as to be maintained in a low pressure state. In the case where the sliding position of the centrifugal spool 7 is in the state shown in the drawing, the hydraulic pressure introduced to the cylinder chamber 66 as mentioned above, is released into the space where the transmission unit 5 is provided via the perforation 70, and is returned to the oil inlet path 16 of the pump main body 1 via the oil returning path 68. Therefore, the inner pressure of the cylinder chamber 66 is not changed regardless of the applied hydraulic pressure generated in the discharge side of the pump main body 1, and thus the clutch piston 61 is not moved by means of the inner pressure so that the transmission unit 5 is not changed into the high speed side. As a result, the rotor shaft 2 and the rotor 10 are driven at a speed lower than the rotational speed of the input shaft 3.

In the case where the rotational speed of the input shaft 3 driven by the engine is excessive, the centrifugal spool 7 moves by means of the centrifugal force due to the rotation of the input shaft 3 as mentioned above, and releases the pressure applied to the hydraulic clutch 6 so as to obstruct the changing of the transmission unit 5 into the high speed side. As a result, the rotational speed of the rotor shaft 2 and rotor 2 are not increased excessively according to an increase in the rotational speed of the input shaft 3, so the inadequate power loss of the engine in high-speed operation. Here, in this state, since the rotational speed of the input shaft 3 is high, the rotational speed of the rotor 10, which is driven with its speed being reduced by the transmission unit 5 is acquired sufficiently, so the actuation of the hydraulic actuating apparatus, which is obtained by supplying oil from the pump main body 1, might not be damaged.

Here, the above embodiment referred to the case where the pump main body 1 is a vane pump, but needless to say, another type of pumps such as a gear pump and trochoid pump may be used as the pump main body 1.

In addition, as the transmission unit 5, various types of transmission units which can be changed between two stages, namely, high and low stages, can be used, but by using the planetary roller transmission unit or planetary gear transmission unit described in the embodiment, such a transmission unit as well as the hydraulic clutch 6 for changing the transmission unit can be arranged compactly in one side of the pump main body 1.

Embodiment 2

Figure 5:
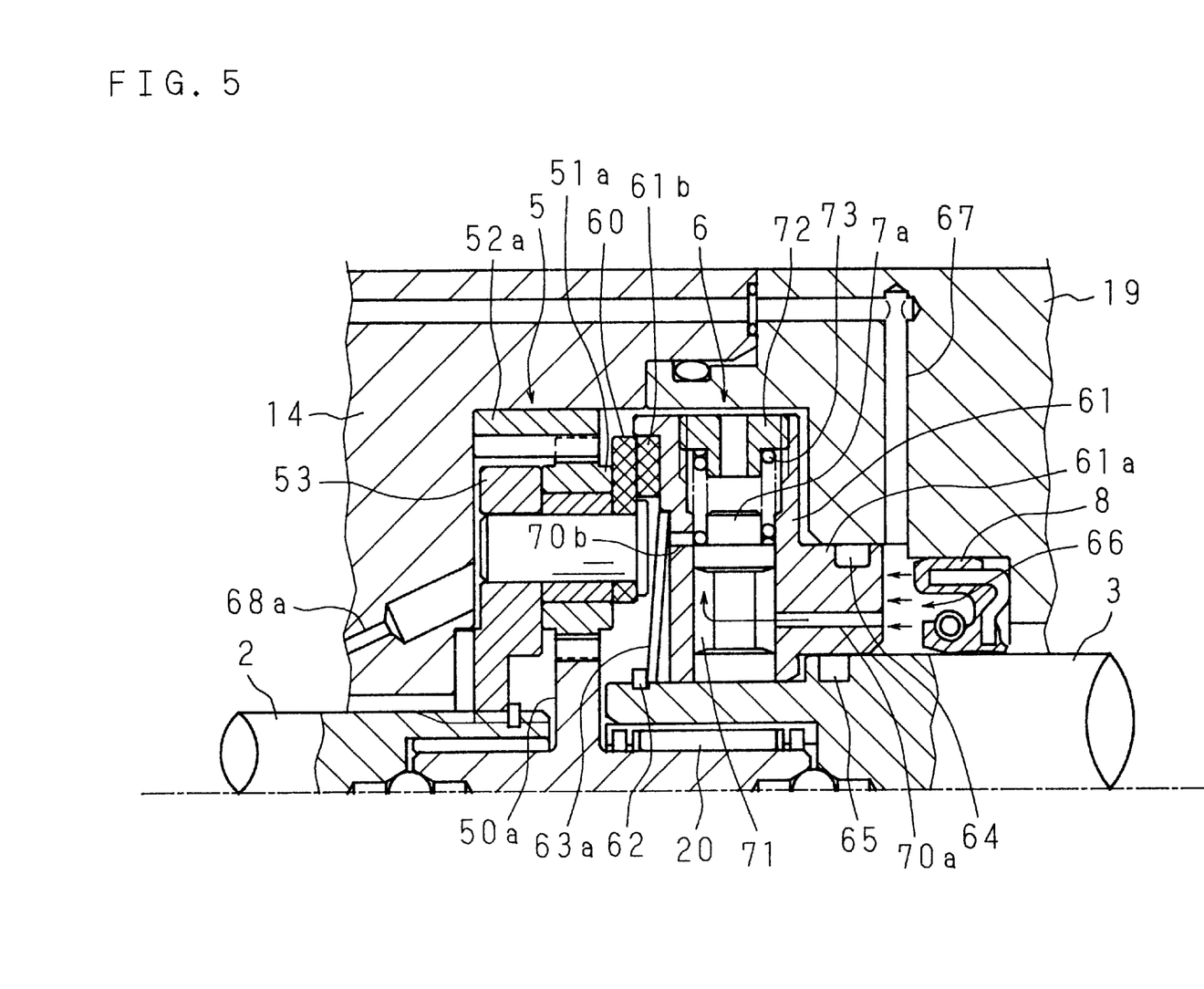
FIG. 5 is an enlarged sectional view showing an essential part of a hydraulic pump of a second embodiment according to the present invention.
Figure 6:
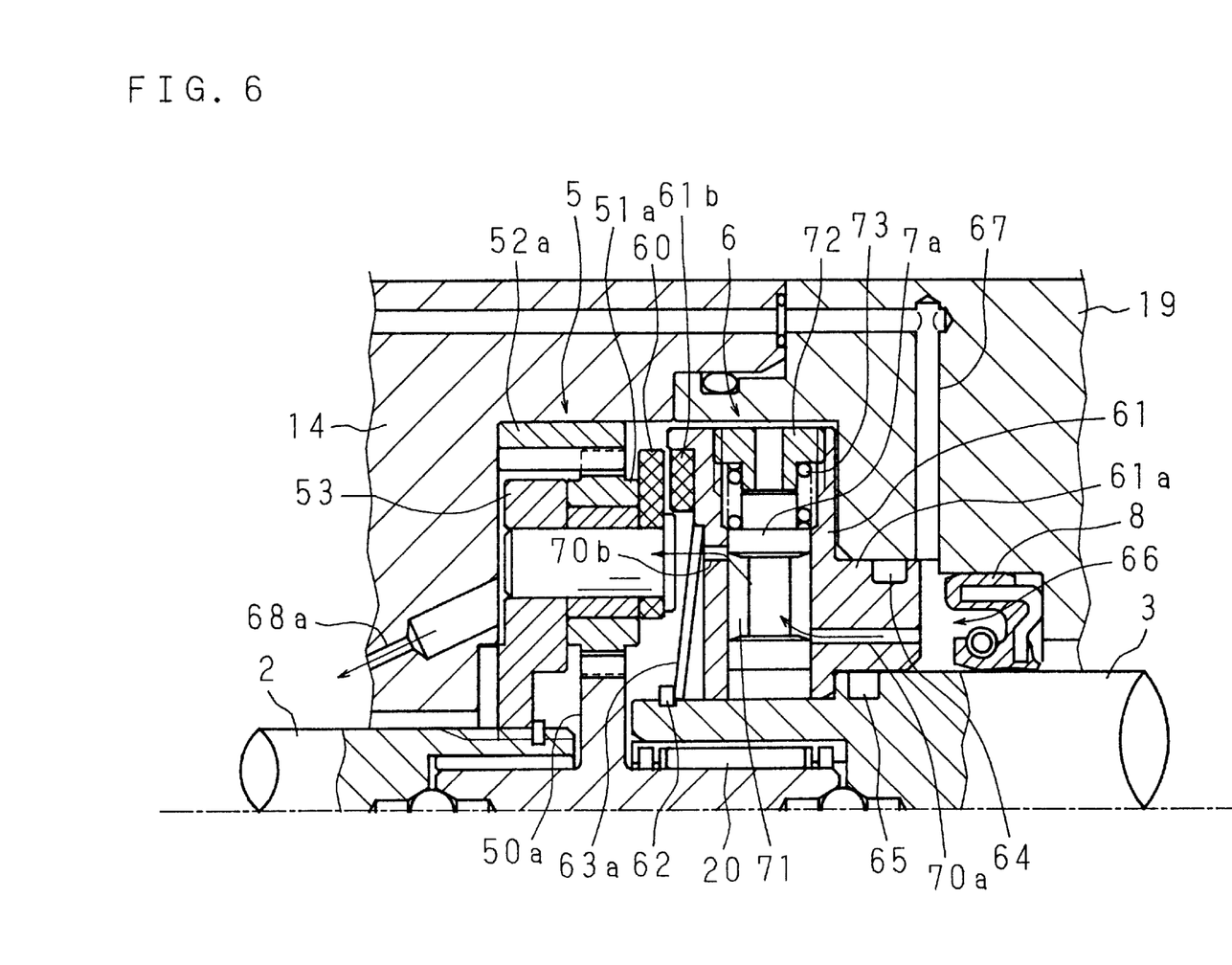
FIG. 6 is an enlarged sectional view showing an essential part of the hydraulic pump of the second embodiment according to the present invention.

FIGS. 5 and 6 are enlarged sectional views of an essential part of the hydraulic pump according to the second embodiment of the present invention. These drawings show the transmission unit 5 and the hydraulic clutch 6 arranged in the portion where the rotor shaft 2 faces the input shaft 3 in the pump housing 14 and transmission housing 19 mounted coaxially, and the same components as those in the first embodiment are represented by the same reference numerals.

The transmission unit 5 in the drawing is constituted as a planetary gear transmission unit having a sun gear 50$a$, planetary gears 51$a$, and a stationary gear 52$a$. The sun gear 50$a$ is a disc-shaped outer gear provided on which gear teeth which can be engaged with the planetary gears 51$a$ are formed in the whole periphery of its outer peripheral surface, and the sun gear 50$a$ is supported to the facing end between the rotor shaft 2 and input shaft 3 via a short supporting shaft protruded from both sides of the central axis portion so as to be rotatable coaxially. Similarly to the first embodiment, the one-way clutch 20 intervenes on the supporting portion of the sun gear 50 in the side of the input shaft 3, and it allows the rotation of the sun gear 50$a$ to precede that of the input shaft 3.

The stationary gear 52$a$ is a circular inner gear on which teeth which can be engaged with the planetary gears 51$a$ are formed on the whole periphery of its inner peripheral surface, and it is fitted into the pump housing 14 so as to be approximately aligned in the axial direction with the position where the sun gear 50$a$ is provided. The planetary gears 51$a$ are mounted on one surface of the disc-shaped carriage 53 which rotates with the rotor shaft 2 so as to be rotatively due to the respective supporting shafts, and they are engaged respectively with the teeth in the outer periphery of the sun gear 50$a$ and in the inner periphery of the stationary gear 52$a$.

In the above arrangement, when the input shaft 3 rotates, this rotation is transmitted to the sun gear 50$a$ via the one-way clutch 20, and the planetary gears 51$a$ which rotatively contact with the outer periphery of the sun gear 50$a$ rotate according to the rotation of the sun gear 50$a$ so as to autorotate along the inner periphery of the fixed gear 50$a$. Accordingly, the carriage 53 of the planetary gears 51$a$ revolves, and the rotor shaft 2 and rotor 10 are rotated at the rotational speed of the carriage 53. The rotational speed of the rotor shaft 2 and the rotor 10 at this time is sufficiently lower than that of the input shaft 3.

In addition, the hydraulic clutch 6 is supported on the tips of the supporting shafts of the planetary gears 51$a$ collectively. The hydraulic clutch 6 is composed of the clutch plate 60 which rotates integrally with the carriage 53 and rotor shaft 2, and the clutch piston 61 which is mounted so as to face the clutch plate 60 and to be movable in the axial direction. The rotation of the clutch piston 61 is restrained by the input shaft 3.

The clutch piston 61 is elasticized in a direction away from the clutch plate 60 by a plate spring 63*a* provided between the clutch piston 61 and spring accession 62 which is mounted so as to be related with the input shaft 3.

The clutch piston 61 mounted in such a manner is protruded towards the side which is not counter to the clutch plate 60 coaxially, and has the small diameter portion 61*a* fitted into the fitting hole connected with the same side of the transmission housing 19 via the seal ring 64. The seal ring 65 is provided on the fitting portion between the small diameter portion 61*a* and input shaft 3. As a result, The cylinder chamber 66 which is sealed tightly is formed between the oil seal 8 for sealing the protruded portion of the input shaft 3 from the transmission housing 19 and the end surface of the small diameter portion 61*a*.

Similarly to the embodiment 1, the cylinder chamber 66 is connected with the discharge side of the pump main body, not shown, by means of the oil returning path 67 bored into the transmission housing 19 and the pump housing 14, and a hydraulic pressure to be applied to the hydraulic actuating apparatus, not shown, is generated in the pump main body according to the rotation of the rotor shaft 2 so as to be introduced. Here, as the pump main body, the vane pump shown in FIG. 1 may be used, or another type of pumps such as a gear pump and a trochoid pump may be used.

In addition, a disc-shaped clutch plate 61*b* whose center is bored is mounted on the other side of the clutch piston 61 so as to face the outer peripheral side of the clutch plate 60, and when the clutch piston 61 moves against the elastic force of the plate spring 63*a*, the clutch plate 61*b* slides on the clutch plate 60. As mentioned above, since the clutch plate 61*b* is arranged separately from the clutch piston 61, a material of the clutch plate 61*b* can be selected freely, and a degree of friction due to the sliding contact with the clutch plate 60 can be set suitably.

The chamber where the transmission unit 5 is provided which face the other side of the clutch piston 61 is connected with the inlet side of the pump main body, by means of a fixed restrictor 68*a* which is formed as a hole with small diameter perforating through the end wall of the pump housing 14 so as to be maintained in the low-pressure state. As a result, the clutch piston 61 is pressed towards the clutch plate 60 by the hydraulic pressure introduced into the cylinder chamber 66, and when the pressing force exceeds the spring force of the plate spring 63*a*, the clutch piston 61 moves towards the clutch plate 60 so as to be pressed against the clutch plate 60 via the clutch plate 61*b* as shown in FIG. 5.

At this time, the carriage 53 of the planetary gears 51*a*, to which the clutch plate 60 is mounted, rotates at a speed same as that of the clutch piston 61 which is rotated by the input shaft 3, and the rotor shaft 2 which supports the carriage 53 rotates at a speed same as that of the input shaft 3. At this time, the sun gear 50*a* rotates at a high speed according to the rotation of the planetary gears 51*a* engaged with the outer teeth of the sun gear 50*a*, but the rotation of the sun gear 50*a* is allowed by the one-way clutch 20 provided between the sun gear 50 and input shaft 3 so as not to obstruct the integral rotation of the input shaft 3 and rotor shaft 2.

As mentioned above, the hydraulic clutch 6 changes the transmission ratio of the transmission unit 5 arranged as the planetary gear transmission unit into high or low speed side by means of the inner pressure in the cylinder chamber 66. Similarly to the first embodiment, the inner pressure of the cylinder chamber 66 changes according to the operating state of the hydraulic actuating apparatus to which a discharge pressure of the pump main body is applied, and it becomes higher during actuating state and lower during non-actuating sate. Therefore, the transmission unit 5 is changed into the high speed side only while the hydraulic actuating apparatus is being actuated, so the rotor shaft 2 rotates at high speed during the actuation. As a result, the hydraulic actuating apparatus is actuated securely by supplying a sufficient amount of hydraulic oil with high pressure. Whereas while the hydraulic actuating apparatus is not being actuated, the rotor shaft 2 rotates at low speed, and as a result, the power loss of the engine which is a driving source is reduced greatly.

The spool chamber 71 is formed as a circular hole perforating from the outer peripheral surface to the radial direction on the clutch piston 61 performing the above operation, and the centrifugal spool 7*a* is housed in the spool chamber 71. Moreover, a first restrictor hole 70*a*, which connects the spool chamber 71 with the cylinder chamber 66, and a second restrictor hole 70*b*, which connects the spool chamber 71 with the chamber where the transmission unit 5 is provided in more outer side of the radial direction than the first restrictor hole 70*a*, are formed on the clutch piston 61 in the axial direction.

Figure 7A:
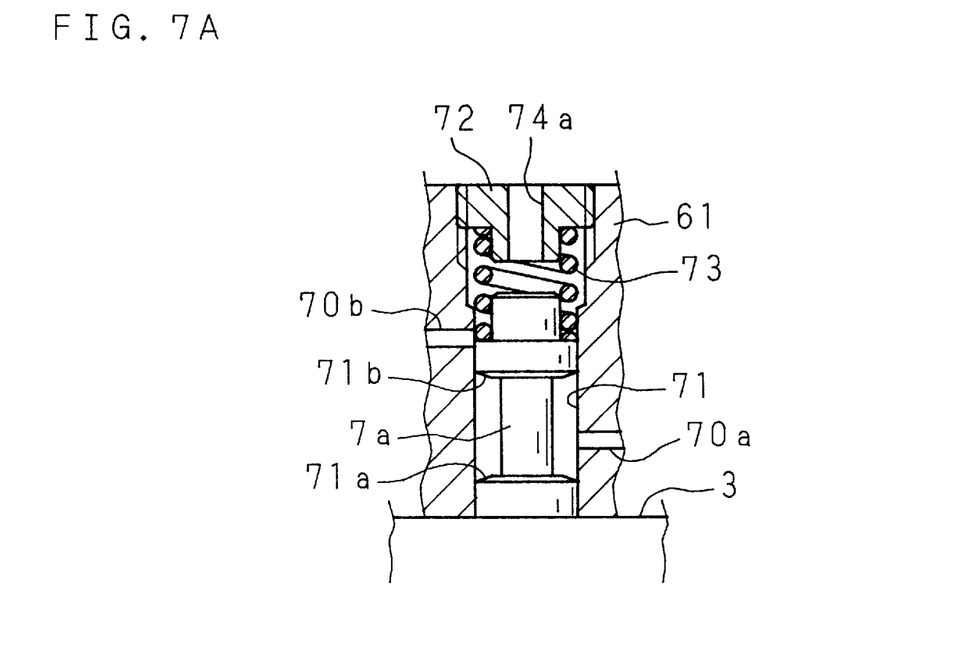
FIGS. 7A and 7B are enlarged sectional views showing a vicinity of a spool chamber for explaining an operation of the centrifugal spool shown in FIG. 6.
Figure 7B:
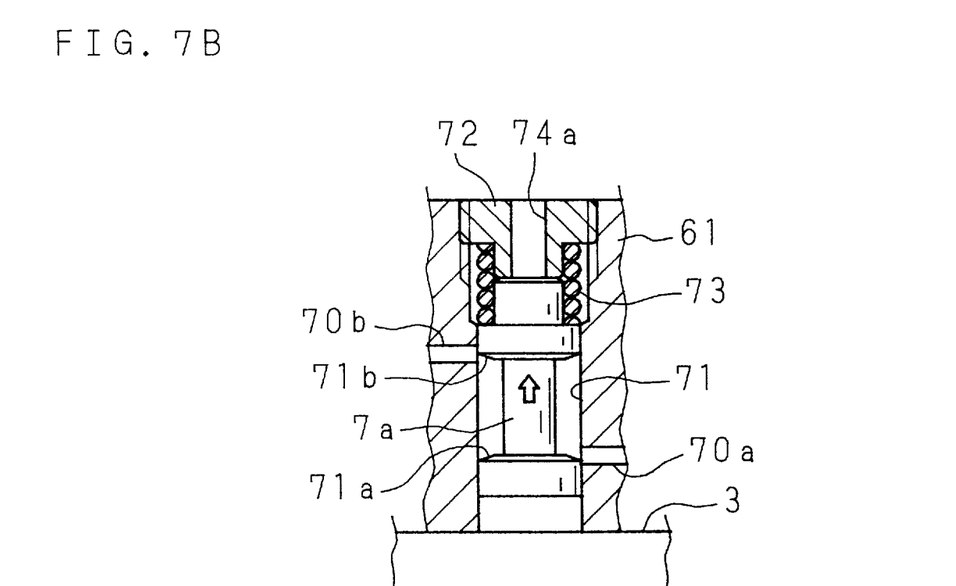

FIGS. 7A and 7B are enlarged sectional view of the vicinity of the spool chamber 71 for explaining the operation of the centrifugal spool 7*a*. As shown in the drawings, the spool chamber 71 is constituted so that its opening end towards the outer diameter side of the clutch piston is sealed tightly by the cover member 72 fitted thereinto, and an opening end in the other side is closed by the outer periphery of the input shaft 3. The centrifugal spool 7*a* has two land portions, which are fitted into the spool chamber 71, in the both sides of the axial direction so as to freely slide, and the land portions are connected with each other by a small diameter portion. The centrifugal spool 7*a* is elasticized towards the inside of the spool chamber 71 by a spring force of the coil spring 73 provided between the centrifugal spool 7*a* and cover member 72, and the centrifugal spool 7*a* can move in the radial direction of the clutch piston 61 against the elastic force.

The land portions in the both sides of the centrifugal spool 7*a* are constituted so that a distance between their facing surfaces approximately corresponds to a distance between the opened positions which are between the first and second restrictor holes 70*a* and 70*b* of the spool chamber 71, and control edges 71*a* and 71*b* are formed on the facing edges of the land portions by chamfering their entire peripheries. Moreover, the both sides of the centrifugal spool 7*a* in the spool chamber 71 are connected with the side where the transmission unit 5 is provided by a fitting gap between a connection hole 74*a* perforating through the axial center portion of the cover member 72 and input shaft 3 so that the pressure is maintained to be substantially uniform. As a result, the centrifugal spool 7*a* moves in the spool chamber 71 without being influenced by a difference in pressure on the both sides.

As mentioned above, the centrifugal force, which directs to the outwardly radial direction, namely, to the opposite direction to the acting direction of the spring force of the coil spring 73 as represented by a white arrow in FIG. 7B, is applied to the centrifugal spool 7*a* housed in the spool chamber 71 according to the rotation of the clutch piston 61 due to the rotation of the input shaft 3. As a result, the centrifugal spool 7a slides according to balance of the centrifugal force and spring force.

In the case where the rotational speed of the input shaft 3 is low and the centrifugal force acting on the centrifugal spool 7a is less than the spring force of the coil spring 73, as shown in FIG. 7A, the centrifugal spool 7a is in the position where it contacts with the outer peripheral surface of the input shaft 3 which is the bottom surface of the spool chamber 71. At this time, the first restrictor hole 70a is opened between the land portions in the both sides of the centrifugal spool 7a, and the second restrictor hole 70b is opened to the outer side than the outer land portion. As a result, the inner pressure of the cylinder chamber 66 remains inside the spool chamber 71. At this time, the transmission unit 5 is changed by the aforementioned operation of the hydraulic clutch 6 so that the rotational speed of the rotor shaft 2 is changed into high or low speed.

Meanwhile, when the rotational speed of the input shaft 3 is high and the centrifugal force acting upon the centrifugal spool 7a exceeds the spring force of the coil spring 73, the centrifugal spool 7a slides to the outwardly radial direction, and when the sliding reaches a predetermined amount, as shown in FIG. 7B, the second restrictor hole 70b is opened into the outer land portion, and the cylinder chamber 66 is connected with the space where the transmission unit 5 is provided. As a result, the inner pressure of the cylinder chamber 66 is released into the chamber where the transmission unit 5 is provided via the first and second restrictor holes 70a and 70b, and as shown in FIG. 6, the inner pressure is released into the inlet side of the pump main body via the fixed restrictor 68a.

Therefore, the inner pressure of the cylinder 66 is maintained lower than the hydraulic pressure generated in the discharge side of the pump main body, and the clutch piston 61 is not moved by the inner pressure, so the transmission unit 5 is not changed into the high speed side. As a result, the rotor shaft 2 is driven at a lower speed than the rotational speed of the input shaft 3.

When the rotational speed of the input shaft 3 exceeds a predetermined speed, similarly to the centrifugal spool 7 in the first embodiment, the centrifugal spool 7a releases the pressure acting upon the hydraulic clutch 6 so as to prohibit the transmission unit 5 to be changed into the high speed side, and the inadequate power loss of the engine during the high-speed operation is reduced.

Further, in the second embodiment, the pressure is released according to the motion of the centrifugal spool 7a via an oil releasing path having the first and second restrictor holes 70a and 70b and fixed restrictor 68a. As a result, the pressure is released gradually with a flow resistance which is generated when pressurized oil flows through the first and second restrictor holes 70a and 70b as variable restrictors and fixed restrictor 68a, and the changing operation of the hydraulic clutch 6 is not performed abruptly. Accordingly, discontinuity of the pressure characteristic is eliminated on the discharge side of the hydraulic pump so that smooth pressure characteristic can be obtained. Moreover, restriction areas in the first and second restrictor holes 70a and 70b can be changed freely by changing the forms of the control edges 71a and 71b formed on the land portions of the centrifugal spool 7a as mentioned above, and generating timing and speed of the changing operation can be adjusted so that desired pressure characteristic can be realized easily.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A hydraulic pump for generating a hydraulic pressure to be applied to a hydraulic actuating apparatus, comprising:

an input shaft being rotated by a power source;

a rotor being rotated by said input shaft interlocked therewith;

transmission means which is provided between said input shaft and rotor and changes a transmission ratio therebetween;

a hydraulic clutch for making said transmission means change by means of the hydraulic pressure; and a centrifugal spool which moves by means of a centrifugal force due to the rotation of said input shaft and releases a pressure acting upon said hydraulic clutch so as to prohibit and transmission means to be changed into high speed side.

2. The hydraulic pump according to claim 1, wherein an oil path for releasing the hydraulic pressure includes:

a chamfered portion formed on a part of said centrifugal spool;

a variable restrictor for changing restriction area according to a form or size of said chamfered portion; and a fixed restrictor for adding a predetermined restriction resistance to the hydraulic pressure passed through said variable restrictor.

3. The hydraulic pump according to claim 1, wherein said transmission means includes:

a plurality of planetary bodies;

holding means which holds said plurality of planetary bodies and rotates integrally with the rotating shaft of said rotor;

a sun disc, provided coaxially between said rotating shaft and input shaft, rotatively contacts from inside with said plurality of planetary bodies; and a one-way clutch provided between said sun disc and input shaft, wherein said hydraulic clutch includes:

a clutch plate which rotates integrally with said holding means; and a piston whose rotation is restrained by said input shaft and which moves in the axial direction by means of the applied hydraulic pressure so as to be pressed against said clutch plate.

4. A hydraulic pump for generating a hydraulic pressure to be applied to a hydraulic actuating apparatus, comprising:

an input shaft being rotated by a power source;

a rotor being rotated by said input shaft interlocked therewith;

transmission means which is provided between said input shaft and rotor and changes a transmission ratio therebetween; and a hydraulic clutch for making said transmission means change by means of the hydraulic pressure wherein an oil path for releasing the hydraulic pressure includes:

a chamfered portion formed on a part of said centrifugal spool;

a variable restrictor for changing restriction area according to a form or size of said chamfered portion; and a fixed restrictor for adding a predetermined restriction resistance to the hydraulic pressure passed through said variable restrictor.

5. The hydraulic pump according to claim 4, wherein said transmission means includes:

a plurality of planetary bodies;

holding means which holds said plurality of planetary bodies and rotates integrally with the rotating shaft of said rotor;

a sun disc, provided coaxially between said rotating shaft and input shaft, rotatively contacts from inside with said plurality of planetary bodies; and a one-way clutch provided between said sun disc and input shaft, wherein said hydraulic clutch includes:

a clutch plate which rotates integrally with said holding means; and a piston whose rotation is restrained by said input shaft and which moves in the axial direction by means of the applied hydraulic pressure so as to be pressed against said clutch plate.

6. A hydraulic pump for generating a hydraulic pressure to be applied to a hydraulic actuating apparatus, comprising:

an input shaft being rotated by a power source;

a rotor being rotated by said input shaft interlocked therewith;

transmission means which is provided between said input shaft and rotor and changes a transmission ratio therebetween; and a hydraulic clutch for making said transmission means change by means of the hydraulic pressure wherein said transmission means includes:

a plurality of planetary bodies;

holding means which holds said plurality of planetary bodies and rotates integrally with the rotating shaft of said rotor;

a sun disc, provided coaxially between said rotating shaft and input shaft, rotatively contacts from inside with said plurality of planetary bodies; and a one-way clutch provided between said sun disc and input shaft, wherein said hydraulic clutch includes:

a clutch plate which rotates integrally with said holding means; and a piston whose rotation is restrained by said input shaft and which moves in the axial direction by means of the applied hydraulic pressure so as to be pressed against said clutch plate.

7. A hydraulic pump for generating a hydraulic pressure to be applied to a hydraulic actuating apparatus mounted into an automobile, comprising:

an input shaft linked with an output terminal of an engine in the automobile;

a rotor being rotated by transmission from said input shaft;

transmission means which is provided between said input shaft and rotor and changes a transmission ratio therebetween;

a hydraulic clutch for making said transmission means change by means of the hydraulic pressure; and a centrifugal spool which moves by means of a centrifugal force due to the rotation of said input shaft and releases a pressure acting upon said hydraulic clutch so as to prohibit said transmission means to be changed into high speed side.

8. The hydraulic pump according to claim 7, wherein an oil path for releasing the hydraulic pressure includes:

a chamfered portion formed on a part of said centrifugal spool;

a variable restrictor for changing restriction area according to a form or size of said chamfered portion; and a fixed restrictor for adding a predetermined restriction resistance to the hydraulic pressure passed through said variable restrictor.

9. The hydraulic pump according to claim 7, wherein said transmission means includes:

a plurality of planetary bodies;

holding means which holds said plurality of planetary bodies and rotates integrally with the rotating shaft of said rotor;

a sun disc, provided coaxially between said rotating shaft and input shaft, rotatively contacts from inside with said plurality of planetary bodies; and a one-way clutch provided between said sun disc and input shaft, wherein said hydraulic clutch includes:

a clutch plate which rotates integrally with said holding means; and a piston whose rotation is restrained by said input shaft and which moves in the axial direction by means of the applied hydraulic pressure so as to be pressed against said clutch plate.

10. A hydraulic pump for generating a hydraulic pressure to be applied to a hydraulic actuating apparatus mounted into an automobile, comprising:

an input shaft linked with an output terminal of an engine in the automobile;

a rotor being rotated by transmission from said input shaft;

transmission means which is provided between said input shaft and rotor and changes a transmission ratio therebetween:

a hydraulic clutch for making said transmission means change by means of the hydraulic pressure; and wherein an oil path for releasing the hydraulic pressure includes:

a chamfered portion formed on a part of said centrifugal spool;

a variable restrictor for changing restriction area according to a form or size of said chamfered portion; and a fixed restrictor for adding a predetermined restriction resistance to the hydraulic pressure passed through said variable restrictor.

11. The hydraulic pump according to claim 10, wherein said transmission means includes:

a plurality of planetary bodies;

holding means which holds said plurality of planetary bodies and rotates integrally with the rotating shaft of said rotor;

a sun disc, provided coaxially between said rotating shaft and input shaft, rotatively contacts from inside with said plurality of planetary bodies; and a one-way clutch provided between said sun disc and input shaft, wherein said hydraulic clutch includes:

a clutch plate which rotates integrally with said holding means; and a piston whose rotation is restrained by said input shaft and which moves in the axial direction by means of the applied hydraulic pressure so as to be pressed against said clutch plate.

12. A hydraulic pump for generating a hydraulic pressure to be applied to a hydraulic actuating apparatus mounted into an automobile, comprising:

an input shaft linked with an output terminal of an engine in the automobile;

a rotor being rotated by transmission from said input shaft;

transmission means which is provided between said input shaft and rotor and changes a transmission ratio therebetween;

a hydraulic clutch for making said transmission means change by means of the hydraulic pressure; and wherein said transmission means includes;

a plurality of planetary bodies;

holding means which holds said plurality of planetary bodies and rotates integrally with the rotating shaft of said rotor;

a sun disc, provided coaxially between said rotating shaft and input shaft, rotatively contacts from inside with said plurality of planetary bodies; and a one-way clutch provided between said sun disc and input shaft, wherein said hydraulic clutch includes:

a clutch plate which rotates integrally with said holding means; and a piston whose rotation is restrained by said input shaft and which moves in the axial direction by means of the applied hydraulic pressure so as to be pressed against said clutch plate.

* * * * *